though passage 18 to intake manifold 13, thereby fur-

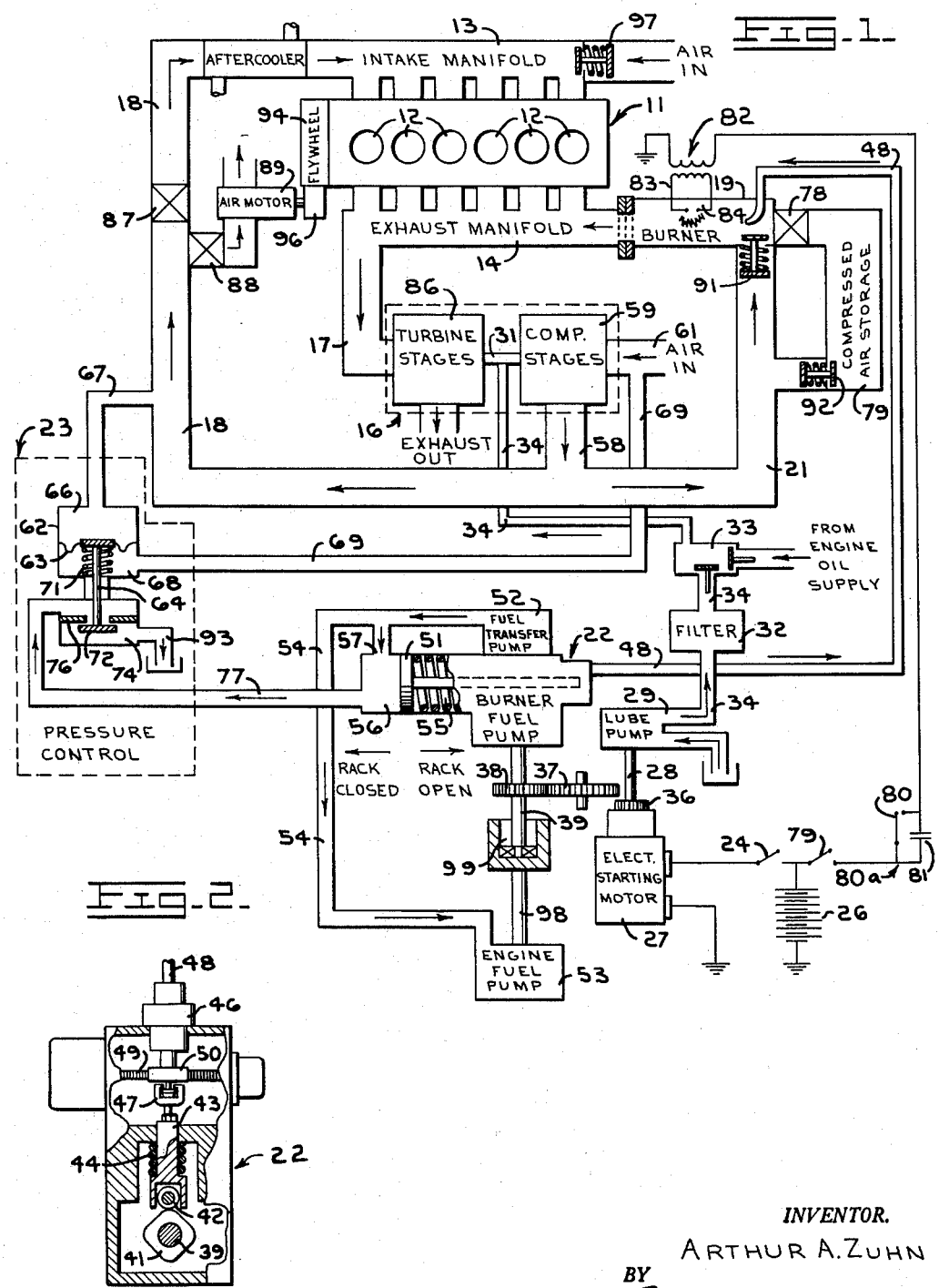

United States Patent Office 3,096,615
Patented July 9, 1963

3,096,615
TURBOCHARGER SYSTEM FOR INTERNAL COMBUSTION ENGINES
Arthur A. Zuhn, East Peoria, Ill., assignor to Caterpillar Tractor Co., Peoria, Ill., a corporation of California
Filed Sept. 21, 1961, Ser. No. 139,707
4 Claims. (Cl. 60—13)

The present invention relates to turbocharger systems and more particularly to a turbocharger system for augmenting the performance of an internal combustion engine.

One of the limiting quantities in the performance of an internal combustion engine is the amount of air delivered to the intake manifold for the purposes of combustion in the engine cylinders. Since the amount of air necessary for proper operation of an engine is often greater than can be supplied at atmospheric pressure, it is common practice to utilize an auxiliary system for supplying additional air to the intake manifold. A known means for supplying additional air to the intake manifold is a turbocharger.

A common problem associated with engines augmented by turbochargers is that the turbocharger supplies the greatest amount of compressed air when it is least needed by the engine, and the least amount of compressed air when it is most needed. This is inherent in the fact that the exhaust gases which drive the turbocharger diminish in quantity with diminishing speed of the engine. Thus, when the engine is operating at low speed, such as under heavy load, the turbocharger is driven at a slow speed and the amount of compressed air available from the compression stage is minimal. When the engine is operating at high speed, such as under low load, the quantity of exhaust gas is high thus resulting in high speeds of the turbocharger and a large quantity of compressed air to the intake manifold. It thus becomes desirable to control a turbocharger utilized to augment the performance of an engine so as to deliver large quantities of air to the intake manifold when the engine speed is low and the air is most needed, and less air when the engine is operating at high speeds and the air requirement is not so great.

Accordingly, it is an object of the present invention to provide a system for efficiently supplying air to the intake manifold of an internal combustion engine.

It is another object of the present invention to provide a self-sustaining gas turbine power system capable of efficiently supplying air to the intake manifold of an internal combustion engine, of operating an air motor for starting the engine, of supplying air to operate auxiliary pneumatic systems, and of operation independent of the engine when supplied with an initiating source of compressed air.

Further and more specific objects and advantages of the invention are made apparent in the following specification wherein a preferred form of the invention is described by reference to the accompanying drawing.

In the drawing:

FIG. 1 is a schematic illustration of a diesel engine and gas turbine power means for controlling same;

FIG. 2 is an enlarged view of a pump utilized in the system of FIG. 1 wherein portions are broken away to more clearly show the apparatus.

Referring to FIG. 1, a diesel engine generally indicated at 11 receives air for combustion in chambers 12 from intake manifold 13. The exhaust gases from chambers 12 are delivered to exhaust manifold 14 from which they flow through passage 17 to drive a turbocharger 16. The compressed air output from turbocharger 16 is delivered through passage 18 to intake manifold 13, thereby furnishing larger quantities of air to the intake manifold 13 than could be obtained at atmospheric pressure. The compressed air from turbocharger 16 is also delivered to a supplemental combustion chamber 19, hereinafter referred to as burner 19, through passage 21. Burner 19 heats and expands the air supply from turbocharger 16 before delivering it to exhaust manifold 14 which communicates therewith. In this manner, exhaust manifold 14 is supplied with additional heated gas for driving turbocharger 16. The amount of additional heated gas delivered to exhaust manifold 14 is controlled by the amount of fuel delivered to burner 19 from independent burner fuel pump 22. A pressure sensing control device 23 regulates the fuel delivered to burner 19 from fuel pump 22 and thereby regulates the addition of heated gas to exhaust manifold 14. The regulator 23 operates in a manner which increases fuel to the burner when the amount of exhaust gas from engine 11 to manifold 14 decreases, and reduces fuel to burner 19 when increased exhaust gas from engine 11 is received by exhaust manifold 14. In this way high speed turbocharger operation is maintained at low engine speeds. Thus, the basic components of the system of the present invention are seen to provide a means by which compressed air from a turbocharger 16 is delivered to an intake manifold 13 of a diesel engine 11 in quantities which are consistent with the needs of the engine.

With diesel engine 11 and turbocharger 16 in a non-operating state, the system is activated by closing switch 24 which allows a battery 26 to energize an electric starting motor 27. Rotation of motor shaft 28 operates a lubrication pump 29 which supplies the necessary lubricant to turbocharger shaft 31 and bearings associated therewith through lubrication filter 32 and a junction valve 33. Lube pump 29, filter 32, valve juncture 33 and turbocharger shaft 31 are all connected by means of lubrication piping 34. The rotation of electric starting motor shaft 28 also induces a Bendix type gear 36 to mesh with an intermediate gear 37 which, in turn, meshes with burner fuel pump gear 38 causing rotation of burner fuel pump shaft 39.

The effect of rotating shaft 39 is best seen with reference to FIG. 2 wherein shaft 39 rotates an eccentric cam 41 secured thereto. Cam 41 bears against a roller 42 on a cam follower 43 which, with a spring 44, imparts reciprocating motion to a plunger (not shown) in housing 46 through swivel means 47. The plunger in housing 46 urges fuel under pressure into fuel line 48 at each stroke of shaft 43. The quantity of fuel metered to line 48 upon each stroke of the pump plunger is controlled by the angular position of the plunger in housing 46 as is well known in the art. The angular position of the plunger in housing 46 is controlled by a rack bar 49 which meshes with a segment gear 50 fixed on the pump plunger.

Referring again to FIG. 1, a spring loaded piston 51 is connected to the rack bar of fuel pump 22 to control the quantity of fuel metered into line 48 per stroke of the fuel pump. Shaft 39 which operates burner fuel pump 22 also operates a fuel transfer pump 52. Fuel transfer pump 52 supplies pressure to engine fuel pump 53 through line 54, burner fuel pump 22, and cylinder 56 through a line 57. The pressure in cylinder 56 counteracts the force of a spring 55 to position piston 51. By controlling the pressure in cylinder 56 the position of piston 51 is controlled which, in turn, controls the amount of fuel metered to line 48. Since the fuel delivered to line 48 is introduced into burner 19, the rate at which additional heated gas is introduced into exhaust manifold 14 is dependent upon the position of piston 51.

Until turbocharger 16 is set into motion, the pressure at the passageway 58 from its compressor 59 is approximately equal to the pressure at the intake passageway 61 thereof. A housing 62 forming part of pressure sensing device 23 is divided into two compartments by a diaphragm 63 connected with a valve stem 64. The upper chamber 66 of housing 62 communicates with passageway 18 by means of a line 67, while the lower chamber 68 communicates with intake line 61 to compressor 59 by means of a line 69. Since the pressure in lines 18 and 61 are equal prior to operation of turbocharger 16, valve stem 64 will be in a position determined only by an opposing spring 71. Stem 64 carries a valve 72 in a valve housing 74 and the spring 71 biases the valve toward a closed position against a seat 76.

Valve housing 74 communicates pneumatically with cylinder 56 by means of a line 77. Thus, operation of fuel transfer pump 52 while turbocharger 16 is not operating will cause a build-up of pressure in cylinder 56 as long as valve 72 remains seated. This pressure urges the piston 51 and rack bar toward a position of maximum fuel delivery from pump 22 to burner 19. This condition is highly desirable since all of the expanding gas to operate turbocharger 16 must come from burner 19 until engine 11 is started.

With maximum fuel being supplied to burner 19 a valve 78 separating burner 19 from a storage tank 79 containing compressed air is opened to allow air to mix with the fuel from line 48 so as to form a combustible mixture. At the same time that valve 78 is opened, a switch 79 is closed to allow electrical energy from battery 26 to energize the electrical circuit comprising a capacitor 81, breaker points 80 which form an interrupter type circuit 80a with capacitor 81, and transformer 82. The secondary 83 of transformer 82 extends into burner 19 and has a spark gap 84 formed therein. The combination of interrupter 80a and transformer 82 provides a circuit which produces sparks across gap 84 to initiate combustion. The expanded gases which result from the combustion in burner 19 enter exhaust manifold 14. The gases in exhaust manifold 14 travel through passageway 17 and into the turbine stage 86 of turbocharger 16 causing rotation thereof which is transmitted to the compression stage 59 through shaft 31. The compressed air from the compression stage 59 of turbocharger 16 is initially prevented from entering the intake manifold 13 of engine 11 by maintaining a valve 87 closed until the engine is started. A valve 88 separating passageway 18 from an air motor 89 is also maintained closed until the time when starting of engine 11 is desired. Thus, all of the compressed air from turbocharger 16 is delivered to burner 19 through passageway 21. A check valve 91 prevents the full flow of compressed air in passageway 21 from entering burner 19 until a predetermined pressure head has been established which completely opens the check valve 91. When check valve 91 is completely opened a complete turbine cycle is established and air from storage tank 79 is no longer necessary. Accordingly, valve 78 between burner 19 and air storage tank 79 is closed and the air utilized to start burner 19 is replenished through check valve 92 which remains opened until a predetermined pressure is achieved in the tank. Check valve 92 will close when a sufficient pressure is built up in storage tank 79 to allow subsequent starting of the turbine cycle. As pressure builds up in passageway 18 due to increased turbocharger operation, a pressure differential will exist across diaphragm 63 of pressure sensing device 23. When a predetermined pressure differential is attained, valve 72 will unseat allowing the pressure in valve housing 74 to escape through outlet 93. This decreases the pressure in chamber 56 permitting the spring 55 to return the piston 56 and rack bar toward low fuel position. This decreases the amount of gas delivered to manifold 14 from burner 19 which, correspondingly, reduces the operating speed of turbocharger 16. Turbocharger 16 will reach and maintain an equilibrium speed until a variation in pressure is sensed by the sensing device 23.

At this stage of operation (engine 11 shut down), turbocharger 16 and the control system attendant thereto is capable of furnishing a supply of compressed air for operating auxiliary equipment. A pneumatically operated system could be energized by communicating with passageway 21, passageway 18, or other such suitable locations. The pressure of the air supplied by turbocharger 16 is determined by the resilience of spring 71 which can be made variable by conventional means. A drop in pressure in passageway 21 due to the operation of a pneumatic system connected thereto (not shown) would result in reduced pressure in chamber 66 of pressure sensing device 23 which, in turn, would cause valve 72 to seat. Seating of valve 72 would result in additional fuel being metered to burner 19, as described, to increase the speed of operation of turbocharger 16, which would re-establish the predetermined pressure in passageway 21. In a like manner, the existence of a pressure in passageway 21 above a predetermined value would be corrected through the action of the sensing device. Thus, the present invention is seen to include an automatically adjusting system for supplying compressed air at a desired pressure.

When turbocharger 16 reaches the stage of operation at which it supplies its own source of compressed air to burner 19, diesel engine 11 can be started by opening valve 87 to admit the proper amount of compressed air to intake manifold 13 and, at the same time, opening valve 88 to supply compressed air to air motor 89 for purposes of turning engine flywheel 94 through conventional gearing 96. Engine 11, which has been preheated by the gases from burner 19 passing through exhaust manifold 14, responds to the action of air motor 89 by initiating and maintaining combustion of the air from intake manifold 13 and fuel from engine fuel pump 53. When the combustion in chambers 12 of engine 11 becomes self-sustaining, air motor 89 is no longer necessary and valve 88 can be closed and valve 87 can be fully opened. Opening of valve 87 momentarily causes a pressure drop in passageway 18 which affects pressure sensing device 23 in such a manner as to cause burner fuel pump 22 to deliver maximum fuel to burner 19. This is necessary in the initial operation of engine 11 since the quantity of exhaust gas from engine 11 is small until the engine attains speed and burner 19 must, therefore, supply the bulk of the gas necessary to operate turbocharger 16. The pressure in passageway 18 will quickly build up, however, since the engine 11 working under no load conditions will rapidly build up speed and drive turbocharger 16 at an increased speed. This build up of pressure in passageway 18 induces pressure sensing device 23 to regulate burner fuel pump 22 in the manner described to reduce the amount of fuel delivered to burner 19. When engine 11 is called upon to operate under high load conditions the speed of the engine decreases with a resulting decrease in exhaust gases through passageway 17 which, in turn, results in decreased speed of operation of turbocharger 16. Decreased speed of operation of turbocharger 16 results in a pressure drop in passageway 18 which results in additional fuel being metered to burner 19 through fuel line 48. The additional fuel in burner 19 allows greater heating of the gases passing therethrough and furnishes the necessary additional gases to operate turbocharger 16 at an increased speed thus supplying greater quantities of compressed air to intake manifold 13 through passageway 18. Since engine 11 is operating under high load conditions and demanding a greater supply of fuel, the additional air is required to support combustion of the fuel.

When engine 11 goes from a high load to a low load condition, the air requirement to intake manifold 13 decreases. Under these conditions the speed of the engine increases which is reflected in the speed and output of the turbocharger and increased pressure in passageway 18 which, in turn, results in reducing fuel supply to burner 19 as described supra. The decreased fuel to burner 19 results in less contribution of gases from burner 19 which, in turn, is responsible for reducing the speed of turbocharger 16. Intake manifold 13 is then supplied with only the necessary compressed air to maintain operation of the engine under low load. A check valve 97 separates intake manifold 13 from the atmosphere and insures that the air pressure in intake manifold 13 never drops below atmospheric pressure.

When the engine 11 has been started by the air motor 89 it drives its own engine fuel pump 53. Fuel pump shaft 98 is coupled to shaft 39 of burner fuel pump 22 through an overriding clutch mechanism 99 so that shaft 39 can be operated by electric starting motor 27 when engine fuel pump 53 is not operating. When the engine is started and fuel pump 53 does operate, however, its shaft 98 starts to drive shaft 39 causing Bendix gear 36 to automatically be disengaged from gear 37.

The lubricating system to turbocharger shaft 31 is operated by engine 11 through valve 33 when the engine is operating. Thus, electric starting motor 27 may be deenergized when the engine is started. Electric starting motor 27 can be replaced by a conventional air motor inasmuch as a source of compressed air in storage tank 79 exists at the time starting is desired. Once operation of turbocharger 16 has been initiated by an air motor the compressor stage 59 will supply air to storage tank 79 as described and thereby supply the air for driving the air motor until such time as its operation is no longer necessary.

Although the specific embodiment of the present invention has been described above with reference to a diesel engine, operation of the system of the present invention is not limited thereto. Any internal combustion engine utilizing a turbocharger can advantageously utilize the present invention by providing a pump to deliver pressure to piston chamber 56 where a fuel transfer pump is not inherent in the engine. This pump could be the engine lubricating oil pump or an auxiliary one. Piston 51 instead of controlling the position of a rack bar could act to control a governor operated throttle to respond to movement of piston 51 in the same manner that rack bar 49 does in the embodiment described. The remaining components of the system of the present invention would be essentially identical.

I claim:

1. In a turbocharger system for an internal combustion engine having an exhaust manifold and an intake manifold wherein the manifolds are immediately adjacent to the engine the combination comprising:
   a turbine communicating with the exhaust manifold and driven by gases therefrom;
   a compressor driven by said turbine and having an output which communicates with said intake manifold;
   a fuel burner chamber having an input for receiving compressed air and an output through which expanded gases pass;
   means communicating the output of said compressor to the input of said fuel burner chamber;
   means communicating the output of said fuel burner chamber into and through the exhaust manifold;
   means for supplying a variable quantity of fuel to said burner chamber; and
   means responsive to intake manifold pressure to vary the quantity of fuel delivered to said burner.

2. The turbocharger system of claim 1 further comprising a compressed air storage tank connected to said burner chamber, and valve means operatively disposed between said tank and said chamber and selectively operable to form communication therebetween.

3. The turbocharger system of claim 1 further comprising:
   a compressed air storage tank;
   valve means operatively disposed between said storage tank and said burner chamber forming a communicating path therebetween; and
   pressure sensitive valve means operatively disposed between the output of said compressor and said storage tank forming a communicating path therebetween, said pressure sensitive valve means responsive to pressure in said storage tank below a desired level to communicate the output of said compressor with said tank and responsive to pressure in said tank above the desired pressure to prevent communication between said tank and the output of said compressor.

4. The turbocharger system of claim 1 wherein the penultimate named means comprises:
   a fuel pump having an output communicating with said burner chamber; and
   adjustable means on said fuel pump for varying the quantity of fuel metered therefrom to said burner chamber;
   and wherein the ultimate named means comprises;
   an engine driven pump supplying pressure fluid to said adjustable means and urging said adjustable means in one direction;
   a pressure sensitive relief valve;
   means communicating said engine driven pump with said relief valve whereby the pressure to said adjustable means is relieved when said relief valve is open; and
   means communicating the pressure sensitive portion of said pressure sensitive relief valve to the output of said compressor whereby said relief valve is responsive to intake manifold pressure above a desired pressure to open and relieve the fluid pressure acting on said adjustable means.

References Cited in the file of this patent

UNITED STATES PATENTS

| | | |
|---|---|---|
| 2,379,455 | Prince | July 3, 1945 |
| 2,608,051 | Nettel | Aug. 26, 1952 |
| 2,654,991 | Nettel | Oct. 13, 1953 |
| 2,840,987 | Bloomberg et al. | July 1, 1958 |
| 2,941,790 | Compton et al. | June 21, 1960 |